United States Patent [19]

Payne et al.

[11] Patent Number: 4,864,870
[45] Date of Patent: Sep. 12, 1989

[54] ANALOG FLOW METER INSTRUMENT

[75] Inventors: Kenneth R. Payne, Menomonee Falls; Norman G. Lebeck, Milwaukee, both of Wis.

[73] Assignee: Waukee Engineering Company, Milwaukee, Wis.

[21] Appl. No.: 221,721

[22] Filed: Jul. 20, 1988

[51] Int. Cl.$^4$ ............................................... G01F 1/22
[52] U.S. Cl. .......................... 73/861.56; 73/DIG. 11; 250/209
[58] Field of Search ........... 73/861.53, 861.54, 861.56, 73/861.58, DIG. 11, 293; 250/209, 577

[56] References Cited

U.S. PATENT DOCUMENTS

| | | | |
|---|---|---|---|
| 3,582,662 | 6/1971 | Soina | 73/861.56 |
| 4,566,337 | 1/1986 | Smart | 73/861.56 |
| 4,630,485 | 12/1986 | Wastl, Sr. | 73/861.56 |

Primary Examiner—Herbert Goldstein
Attorney, Agent, or Firm—Andrus, Sceales, Starke & Sawall

[57] ABSTRACT

An analog flow meter instrument includes a flow meter monitoring the flow of fluid. A sensor unit is secured to the flow meter and include an indicator rod in an oil filled tube. The rod extends into the flow meter and is positioned in accordance with the flow. The sensor includes a housing having a slot to visually read the location of the rod. A light beam unit is mounted to one side of the tube and a plurality of phototransistors in a linear array are mounted to the opposite side of the tube. The phototransistors are connected in a current summing network to generate an analog current signal, the amplitude of which is linearly related to the fluid flow. The output signal is amplified and connected to output devices. The analog signal can be reliably transmitted over relatively long distances within the factory environment using conventional low voltage wiring. A "dirty" oil monitor is connected to the zero flow phototransistor and includes an LED which is energized at zero flow and with flow if the dirty oil blocks proper light transmission.

10 Claims, 2 Drawing Sheets

ANALOG FLOW METER INSTRUMENT

BACKGROUND OF THE PRESENT INVENTION

The present invention relates to an analog flow meter instrument and particularly to such an instrument for establishing an analog electrical signal linearly related to a fluid flow.

In various operating systems, the flow of a fluid is monitored on a continuous basis to insure appropriate functioning of the system. The flow may be monitored by a flow meter and provide a visual readout of the flow rate. The flow monitor or sensor may be connected into a control system to control the flow, or provide outputs indicative of the system condition including alarm conditions. In either system, the flow sensor may require mounting at the machine or some other remote location, with the signal transmitted to a remote control station. With modern day computer designs and the like, various digital monitors with digital transmission of the flow-related signals have been developed and operated satisfactorily in various environments. A typical digital system is shown in U.S. patent application "Linear Digital Flowmeter" with Ser. No. 06/669,090, now U.S. Pat. No. 4,774,676, filed by Stenzel et al and assigned to a common assignee with the present invention. Such systems are relatively complex and thereby costly. Although digital signals are readily transmitted over long lengths, extraneous signals may be induced into the signal line in various commercial installations.

There is therefore a need for a less costly system which will also provide for a reliable transmission of the flow meter signal over relatively long lines in a manufacturing and operating environment.

SUMMARY OF THE PRESENT INVENTION

The present invention is particularly directed to an analog flow meter instrument having means for monitoring of the flow with direct creation of an analog signal proportional to the flow. Generally, in accordance with the present invention, the flow meter includes a flow responsive element coupled to a sensor unit, and particularly to position an indicator rod-like element in an oil filled monitoring tube. A light bar is mounted to one side of the tube and a plurality of photosensitive current output elements are mounted in a linear array to the opposite side of the tube. In accordance with the teaching of the present invention, the photosensitive elements are connected in a current summing network to generate a current signal directly related to the position of the flow positioned rod-like element. The output signal is amplified to produce an analog current signal, the amplitude of which is linearly related to the fluid flow. The analog signal can be reliably transmitted over relatively long distances within the factory environment using conventional low voltage wiring.

The oil in the tube is generally a clear light transmitting oil with the position related indicator providing an essentially precise definition of the location of the flow related element. If however, the oil becomes dirty as a result of foreign matter in the surrounding environment, the current signal is essentially lost or at least at a minimum becomes unreliable. The present invention monitors the output of a selected phototransistor to detect dirty oil. The lowermost phototransistor is advantageously selected to respond to any settlement of foreign matter in the tube. A suitable alarm or other output alerts the user of the condition.

In a particularly practical application, the instrument is constructed with a housing essentially as disclosed in the previously identified patent application, with an LED light bar and a plurality of phototransistors to the opposite sides of the oil filled tube. The phototransistors are secured to an analog circuit board and mounted within the housing. Each of the phototransistors is connected through a summing resistor to a common output line. A shaping and amplifier unit is mounted on the board and connected to the output line to develop an output control signal suitable for transmission to a control system.

BRIEF DESCRIPTION OF THE DRAWINGS

The drawings furnished herewith generally illustrate the best mode presently contemplated for the invention and are described hereinafter.

In the drawings:

FIG. 3 is a schematic diagram of the readout circuit of the flow meter unit shown in FIGS. 1-2a.

DESCRIPTION OF THE ILLUSTRATED EMBODIMENT

Figure 1:
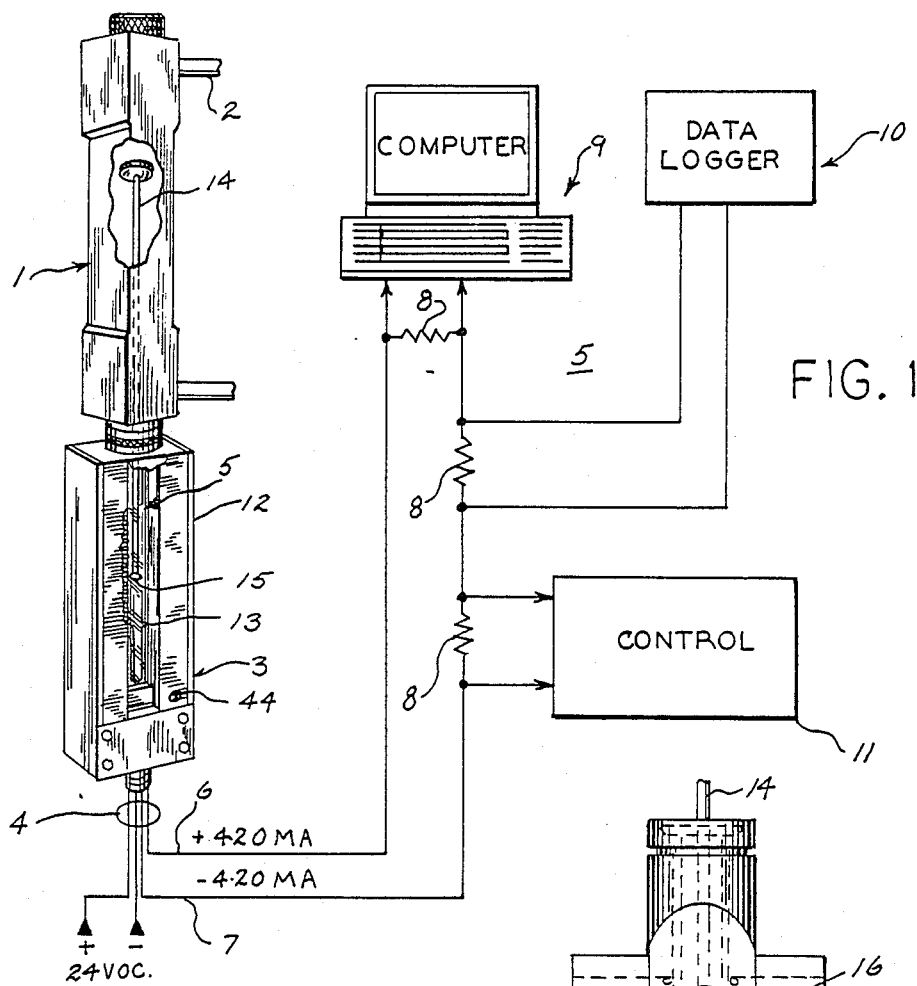
FIG. 1 is a diagramatic illustration of a flow metering system incorporating a flow meter and sensor unit with a electrical analog output signal in accordance with the teaching of the present invention.
Figure 2:
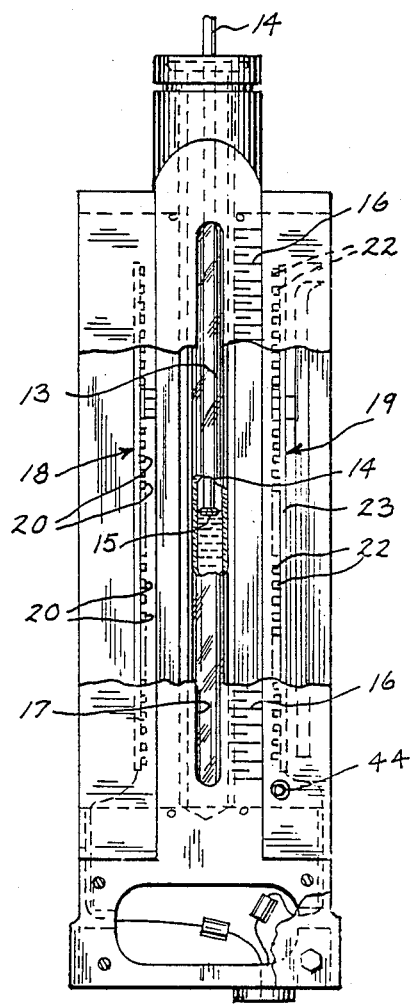
FIG. 2 is a view of a sensor unit forming an integrated part of the flow meter system shown in FIG. 1.

Referring to the drawings and particularly to FIG. 1, a flow meter 1 is illustrated connected in a flow line 2 for measuring the flow rate of the fluid flowing through the line. The flow meter may be constructed to monitor the flow rate of a liquid or the flow rate of a gas. In either system, the flow meter 2 is coupled to a related sensor unit 3 mounted to the lower end of the flow meter 1. The sensor unit 3 generates an analog signal at an output cable 4 and provides a direct visual output reading on a scale unit mounted to the front of the sensor unit 3. The electrical analog signal is transmitted over the cable 4 to various control and recording devices 5. For example in FIG. 1, the output cable 4 includes signal lines 6 and 7 with appropriate coupling resistors 8 to a computer unit 9, a data logger 10 and a flow control unit 11 for controlling of the flow.

The sensor unit 3 includes an outer housing 12 with a tube 13 aligned with the flow meter 1. The tube 13 is filled with a suitable oil. A float rod 14 is mounted within the tube 13 with a disk-like indicator 15 secured at the lower end and providing a visual readout of the location of the float rod 14 within the tube 13. The float rod 14 projects upwardly from the sensor unit 3 into the flow meter 1. The float rod 14 is moved by the flow through meter 1, with its position within the flow meter directly and proportionally related to the rate of flow. The indicator 15 thus is positioned within the tube 13 in accordance with the flow rate. A suitable readout scale 16 is provided on the front side of the housing 12 immediately adjacent a slot 17 exposing the tube 13. The housing 12 projects laterally from the enclosed tube. An LED light bar 18 is secured within the one side of the housing 12 shown to the left in alignment with the tube 13. A phototransistor bar 19 is secured to the opposite side of the housing 12 in alignment with the two. The LED light bar 18 includes a bank of longitudinally spaced LED's 20 to form a continuous bar or beam 21 of light transmitted to and through the tube 12 and into the opposite side of the housing 12. The phototransistor bar 19 includes a plurality of immediately adjacent phototransistors 22 mounted on a suitable support plate or board 23 and located in close spaced relation throughout the length of the tube 12. The float rod 14 thus functions to interrupt the light beam 21 to the phototransistors 22 in accordance with the float related location of the float rod 14 in the tube 12. With zero flow, the float rod 14 drops downwardly with the indicator 15 at the lower or zero flow end of the tube 12. The float rod 14 breaks the complete light beam 21 and all of the phototransistors 22 assume the quiescent or off state. As flow is established through the meter 1, the float rod 14 rises with the indicator moving upwardly within the tube 12, and the indicator 15 provides visual readout of the flow rate on the scale 16. Simultaneously, the upward movement of the rod 14 and indicator 15 exposes and allows the transmission of the light beam 21 through the lower portion of the tube 12 to provide corresponding energization and activation of the phototransistors 22.

The housing structure, the light bars and the support of the phototransistors can all be made in accordance with the previously identified patent application. The basic structure of the flow meter with the visual output indicating unit is also disclosed in U.S. Pat. No. 4,440,028 which issued Apr. 3, 1984 to Ralph W. Ramlow and is assigned to the assignee of the present invention.

The above application discloses a digital output with a corresponding digital logic system for transmitting of the control signal to various devices. The present invention is particularly directed to an analog signal output generator circuit for directly generating an analog signal in accordance with the output of the bank of phototransistors.

Figure 3:
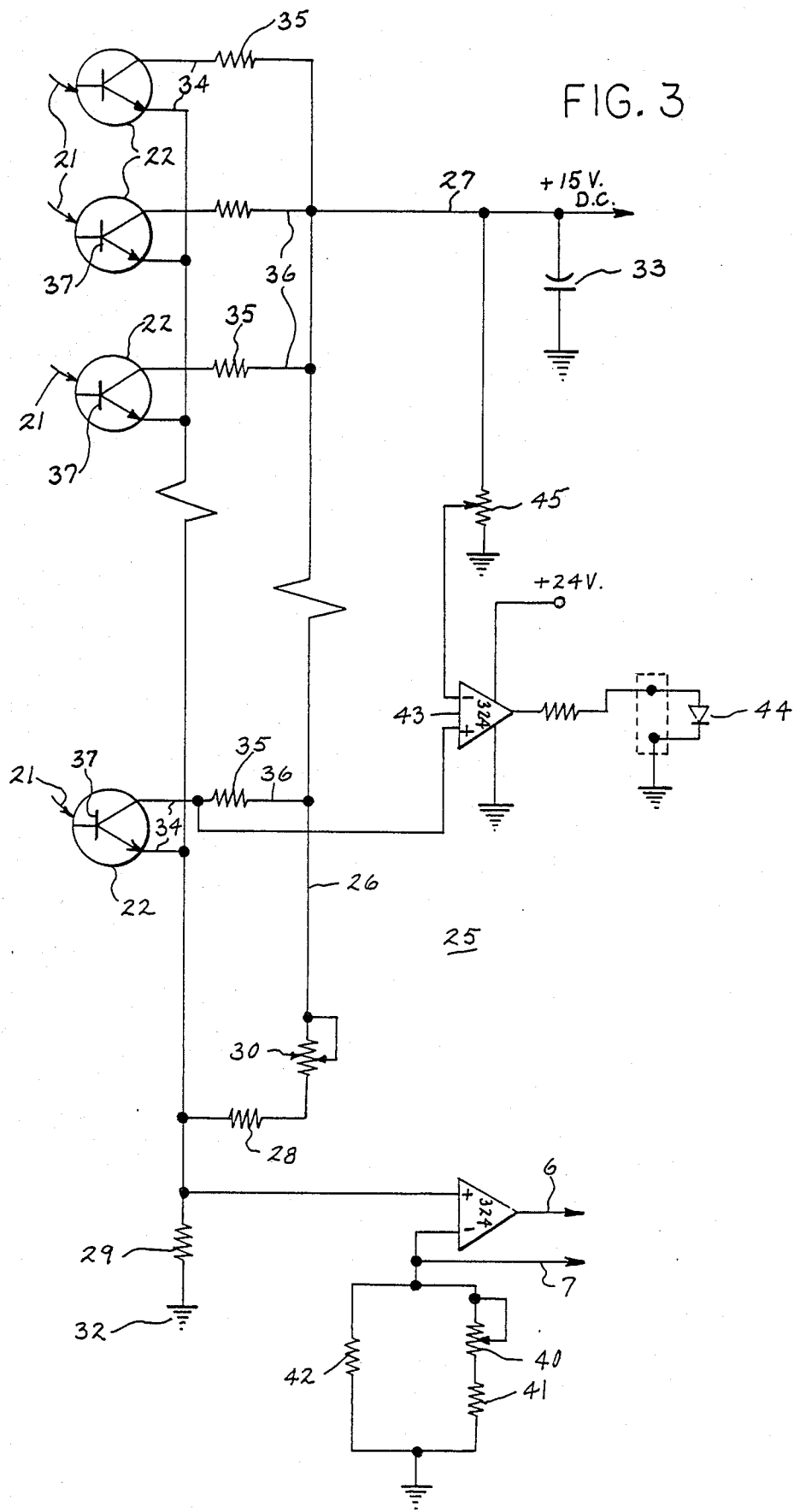

The illustrated sensor unit 3 includes a sensing circuit 25 shown in FIG. 3 having a voltage dividing network 26 connected to a low voltage supply line 27. The network 26 includes two series connected fixed resistors 28 and 29 and an adjustable series connected potentiometer 30. The series connected resistors 28-30 are connected between the positive 15 volt DC supply line 27 and ground 32. A small capacitor 33 is connected between the supply line 27 and ground to protect the circuit, eliminate transient signals and the like.

Each of the phototransistors 22 is illustrated as a NPN transistor having a collector-to-emitter circuit 34 connected in series with a resistor 35 in an output branch circuit 36. Each branch circuit 36 is connected in parallel with each other and in parallel with the series resistors 28-30. Each of the phototransistors 22 has its base 37 exposed and aligned with the light beam 21. The phototransistors 22 are normally off and non-conducting with a dark base. When the light beam 21 is broken, the corresponding phototransistor 22 is therefore non-conducting or off and the corresponding resistor 35 is effectively removed from the circuit. When the light beam 21 is passed through the tube 12 onto the corresponding phototransistor 22, the exposure of the base 37 to the light generates a current of a selected level. The parallel circuit and connection of the resistors 35 provides for summing of the individual currents to form a low level output current linearly proportional to the location of the rod 14 and indicator 15 and therefore of the flow rate. This is a small but accurate current signal.

The summed current is applied to a suitable operational amplifier 38 and amplified to provide an output current which varies linarly between a low or zero flow reading and a maximum flow reading of the sensor unit.

In the illustrated current, the inverting input 39 of the amplifier 38 is connected to ground in series with a potentiometer 40 in series with a fixed resistor 41 and in parallel with an output resistor 42. The potentiometer 40 provides for adjustment of the maximum output of amplifier 38. In a typical application, the amplified output current may vary between 4 millamp (Ma) and 20 Ma as a typical range. With the indicator 15 at the lowest level breaking the complete light beam 21, an output of 4 Ma is established across the output terminals of the amplifier.

The potentiometer 30 adjusts the minimum output current level with all of the phototransistors turned off. In the typical application, the output level equal to 4 Ma is provided.

Thus, in the illustrated embodiment of the invention, the DC current loop with a current range of 4 to 20 Ma DC is compatible with standard current instrumentation widely used in industry. A single output is illustrated with the positive and negative signal lines 6 and 7. The voltage compliance is 20 volts permitting resistive loads up to 1,000 ohms. With the positive and negative signal lines, the output is a current loop floating above ground. The output signal must therefore be interconnected through the coupling resistors 8 and not tied directly to power supply ground.

The system preferably includes a dirty oil indicator to generate an output signal if the oil in tube 12 prevents transmission of light beam 21 and thus gives a false output with the indicator rod 14 displaced from within the light beam 21. An amplifier 43 is illustrated connected between the common line from the 15 volt power supply and the collector of a selected phototransistor 22a. The phototransistor 22a selected is the first phototransistor at the low end of the unit 3 or one of the phototransistors spaced from the first phototransistor. The amplifier 43 is biased to provide an output signal with the transistor off. The output of amplifier 43 is connected to energize a dirty "oil" lamp 44. If the indicator 15 moves past the selected phototransistor 22a without providing a summing signal, the amplifier 43 continues to conduct and energizes the dirty oil light 44. The amplifier 43 is connected to the power supply through an appropriate potentiometer 45 to preset the signal level necessary to operate the dirty oil lamp, and allows factory calibration of the unit to insure accurate detection of the condition of the oil.

The dirty oil indicator lamp 44 is preferably an LED lamp mounted within the phototransistor chamber of housing 12 and when energized is visable at the lower end of the sight glass tube 13. The LED lamp 44 is illuminated with the unit at zero flow and will continue to be illuminated as the indicator moves from zero flow if the oil level is so dirty as to interfere with forming the desired linear output signal. Thus, the movement of the indicator from the zero phototransistor and the selected phototransistor 22a should operate to turn on the selected phototransistors. When the phototransistor 22a turns on, the voltage at the collector decreases and the "dirty" oil amplifier 43 compares the voltage to the reference voltage at potentiometer 45. With clean oil, the comparator turns off the lamp 44. As the oil becomes dirty, the level of conductivity of the phototransistor 22a is less and the voltage at the collector increases. At a selected level of dirt in the oil, the voltage rises above the reference voltage at the potentiometer, and 1 and 44 remains "on".

The output amplified signal is transmitted via the output lines 6 and 7 to the several output devices. The line can be a simple low voltage wire such as 20 to 22 gage. The length and guage of the wire is not critical nor is sheathing required other than in environments where extreme electrical interference is anticipated. Thus, the present invention which uses a direct analog signal transmission is not sensitive to extraneous signals such as encountered in digital signal transmission systems.

The adjustable factory calibrating potentiometers are mounted to the circuit board within the housing and preferably locked in place to permit only factory adjustment.

The output signal can be readily correlated by the user at all times to a visual inspection of the readout on the sensor unit. In the event of any electronic or electrical problems not only within the unit but within the total installation, the user can conveniently and readily observe the flow rate on the sensor unit and provide any necessary adjustments on a manual basis. Thus, the loss of the automatic control does not totally shut down and require a shut down of the system but can provide for continued manual response.

The illustrated embodiment includes the oil filled tube. The sensor may be operated without oil, and with air or ther medium. Certain applications such as monitoring the flow of oxygen may require the sensor to operate filled with the medium being monitored.

Various modes of carrying out the invention are contemplated as being within the scope of the following claims particularly pointing out and distinctly claiming the subject matter which is regarded as the invention.

We claim:

1. A linear analog flow meter apparatus, comprising a transparent sight glass tube coupled to a movable indicator unit positioned within said sight glass tube in accordance with the flow, a housing coupled to said sight glass tube and establishing a substantial light enclosure, a light bank secured within said housing and establishing a light beam aligned with and passing through said tube, a plurality of individual light sensitive elements arranged in a bar fashion to the opposite side of said tube and operable to establish a current flow in response to engagement by said light beam, and a summing circuit means connected to said light sensitive elements and summing the output current flow of said elements and establishing a current signal linearly proportional to the position of the indicator in said tube.

2. The analog flow meter apparatus of claim 1 including an amplifying means connected to said summing circuit means for amplifying said current signal.

3. The apparatus of claim 2 wherein said amplifying means establishes a floating D.C. current signal including a positive output signal line and a negative output signal line.

4. The apparatus of claim 3 having an adjustable potentiometer means for adjusting the output range of said D.C. current signal.

5. The apparatus of claim 1 including a visual readout coupled to said indicator unit and operable to provide a continuous visual readout of the flow.

6. The apparatus of claim 1 wherein said tube is filled with a light transparent oil, said oil being subject to foreign matter to reduce the transparency to said light beam, said elements being spaced to define a minimum flow element at one end and a maximum flow element at the opposite end, and an oil monitor unit connected to one of said light sensitive elements spaced from said minimum flow element and establishing a dirty oil output in response to the present of a selected level of foreign material in the oil aligned with said connected element.

7. The apparatus of claim 6 wherein said oil monitor unit is connected to the element immediately adjacent said minimum flow element.

8. A linear analog flow meter instrument, comprising a float rod assembly moving within a passageway through which fluid flows for positioning in accordance with the rate of flow of fluid therethrough, a transparent sight glass tube coupled to said passageway, said rod assembly extending into said glass tube and having a movable indicator within said sight glass tube, a light transparent oil filling said tube, a housing coupled to said sight glass tube and establishing a substantial light enclosure, a light bar within said housing aligned with the sight glass tube and establishing a light beam passing through said sight glass tube, a plurality of individual phototransistors arranged in alignment in a bar fashion within said housing and aligned with the light beam to the opposite side of said sight glass tube, and a resistive summing network coupled to sum the output of each of said phototransistors and establishing a current signal linearly proportional to the position of the indicator in said sight glass tube.

9. The apparatus of claim 8 having adjustable means for setting the range of the flow rate.

10. The linear analog flow meter instrument of claim 8 wherein said light bar includes a plurality of LED diode lamps arranged in alignment, and transmitting said light beam through said tube.

* * * * *

UNITED STATES PATENT AND TRADEMARK OFFICE
CERTIFICATE OF CORRECTION

PATENT NO. : 4,864,870

DATED : September 12, 1989

INVENTOR(S) : Kenneth R. Payne et al

It is certified that error appears in the above-identified patent and that said Letters Patent is hereby corrected as shown below:

Col. 6, line 22, delete "present" and substitute therefor ---presence---.

Signed and Sealed this

Twelfth Day of March, 1991

*Attest:*

HARRY F. MANBECK, JR.

*Attesting Officer*  *Commissioner of Patents and Trademarks*